March 27, 1962 H. J. B. HERBRUGGEN 3,027,168
PACKING RING
Filed Dec. 5, 1957

INVENTOR.
HEINRICH J. B. HERBRUGGEN
BY
Bates, Teare & McBean
ATTORNEYS

United States Patent Office 3,027,168
Patented Mar. 27, 1962

3,027,168
PACKING RING
Heinrich J. B. Herbruggen, 4214 Brooklyn Ave., Cleveland, Ohio
Filed Dec. 5, 1957, Ser. No. 700,863
6 Claims. (Cl. 277—215)

This invention relates to packing rings or seals, and more particularly to a packing ring having side walls adapted to be expanded against sealing surfaces by fluid pressure, to provide an effective seal.

In the following specification and accompanying drawings, the packing is shown and described in connection with an assembly of parts having reciprocating motion, as for instance a piston and cylinder arrangement, but it will be understood that the packing or sealing element of the invention may also be effectively utilized in rotary motion arrangements.

The molded variety of packing rings such as O-rings, and the channel type or U-cup rings are well known in the art. However, these types of packing rings have various shortcomings, especially when used to provide a seal in a reciprocating motion arrangement. An O-ring packing has a tendency to twist and is comparatively easily cut by foreign matter on the confronting surface of a part of the rotary or reciprocating motion arrangement. In either of the latter cases, leakage of the fluid will occur. The channel or U-cup packing in which the side walls or wings are adapted to be expanded by fluid pressure in the channel, into sealing relationship with confronting walls or surfaces of the relatively movable parts of the assembly, will not generally twist and usually is effective to wipe off foreign matter. However, the channel or U-cup type of seal does not offer effective sealing characteristics under very low pressure conditions. Accordingly, it is the usual practice to use spring actuated or some other type of expander means with the channel type of packing, so as to hold the wings or lips of the U-cup expanded when there is no fluid pressure, or when the pressure is insufficient to maintain the seal. In the use of both types of packings (i.e. the O-ring and the U-cup), the thickness of the body of the packing ring is greater than the receiving space between the operating parts of the assembly being sealed. By virtue of the resiliency or "elastic memory" of the plastic material of the packings, a certain contact pressure is achieved between the packing and the confronting surfaces of the sealed parts. This contact pressure is generally greater with the O-ring type of packing as compared to the U-cup variety, and thus the O-ring packing generally provides a better seal under low pressure conditions.

The present invention provides a packing that generally retains the outer, forwardly divergent profile of the U-cup design of packing, but wherein the space defined by the channel or lips of the prior art U-cup type is completely filled with material. The latter structural arrangement of packing provides a seal which provides a greater pressure against the confronting surfaces of the sealed parts of the assembly as compared to the prior art U-cup packing, gives a greater service life to the packing or seal, as compared to an O-ring packing of like initial contact pressure, and permits increased manufacturing tolerances between the relatively movable parts of the assembly being sealed. In addition the packing seal of the invention is provided with generally radially extending grooves on the "no fluid pressure" or rear side thereof, or in other words on the side of the seal opposite to that on which the fluid pressure acts. Such grooves will provide a seal of the above mentioned type which will be readily urged into sealing engagement with the confronting surfaces of the relatively movable parts of an assembly being sealed, upon the application of fluid pressure to the front or "fluid pressure" side of the seal, and which will respond substantially instantly into sealing engagement, though initially the sealing sides or surfaces of the packing only barely touch the confronting surfaces of the relatively movable parts of the assembly.

Accordingly, an object of the invention is to provide a packing which has greatly improved sealing characteristics as compared to prior art arrangements of packing elements.

Another object of the invention is to furnish an improved packing which provides greater initial pressure as compared to a U-cup type ring, against the confronting surfaces of the relatively movable parts of an assembly being sealed, and which possesses longer wearing and improved sealing characteristics as compared to known types of seals.

A further object of the invention is to provide a packing which will furnish an effective seal between relatively movable parts of an assembly even though the tolerances between such parts are substantially greater than those heretofore provided.

A still further object of the invention is to provide a packing ring in which the body of the ring is of generally trapezoidal configuration in longitudinal cross-section and wherein the ring embodies generally radially extending grooves in the rear or "no fluid pressure" side of the sealing ring.

Other features and advantages of the invention will be apparent from the following description taken in conjunction with the accompanying drawings wherein.

Figure 1:
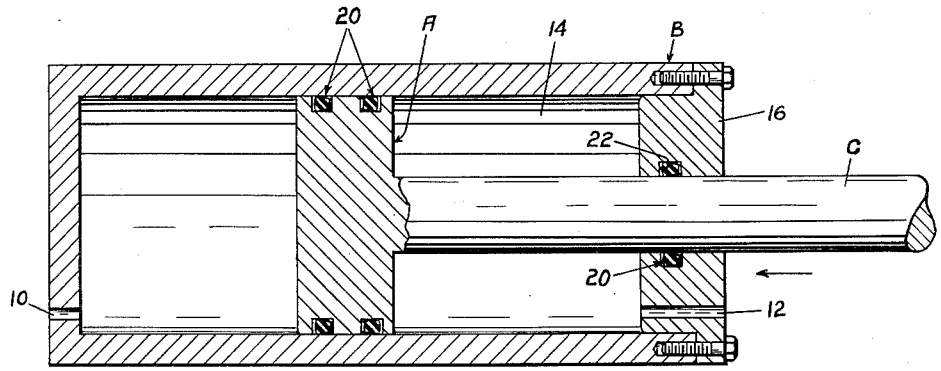
FIG. 1 is a vertical, sectional view of the packing seal of the invention disposed in an environmental setting of a reciprocating motion assembly, and more particularly in a piston and cylinder arrangement.

Referring to the drawings, there is shown a double acting piston and cylinder assembly having passageways 10 and 12 therein for passage therethrough of fluid under pressure. A piston A is disposed in cylinder B and has a piston rod C extending outwardly of the cylinder chamber 14. A removable cap member 16 closes one end of the cylinder chamber and guides the piston rod C for axial movement with respect to cylinder B. Piston A has a plurality of grooves 18 extending circumferentially therearound, and which are adapted to receive therein a packing element 20 constructed in accordance with the instant invention. Cap member 16 also has an arcuate like groove 22 therein for receiving another of the packing elements of the present invention.

Figures 4, 5:
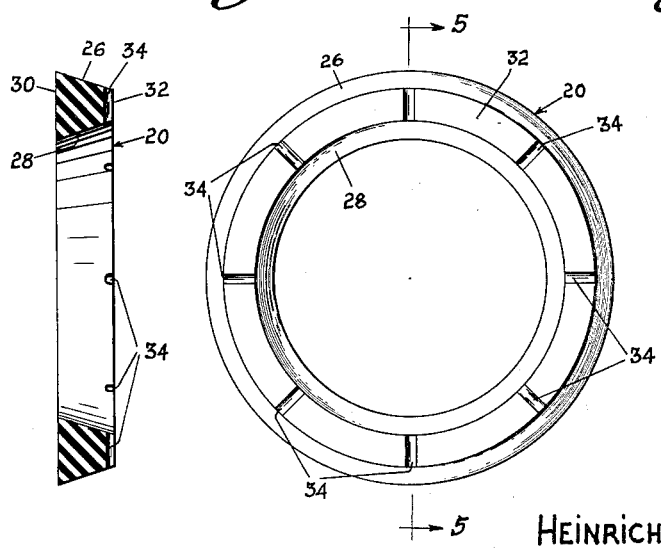
FIG. 4 is a rear end view of the packing ring of the invention taken generally from the right of FIG. 5.
FIG. 5 is a vertical sectional view taken generally along lines 5—5 of FIG. 4.

Referring in particular to FIGS. 4 and 5, packing 20, in the form shown in the drawings, comprises a resilient closed ring of rubber or plastic like material with the body of the ring being of generally trapezoidal configuration in longitudinal cross-section, and having generally straight and forwardly divergent outer and inner wall surfaces 26 and 28 respectively, when the ring is in free or uncompressed condition. The front and rear surfaces 30 and 32 of the ring are substantially planular and vertically extending in generally parallel relationship, when the ring is in said last mentioned condition.

A plurality of circumferentially spaced, generally radially extending grooves or passageways 34 are provided in the rear or "no fluid pressure" surface 32 of the packing ring for a purpose to be hereinafter discussed.

Figures 2, 3:
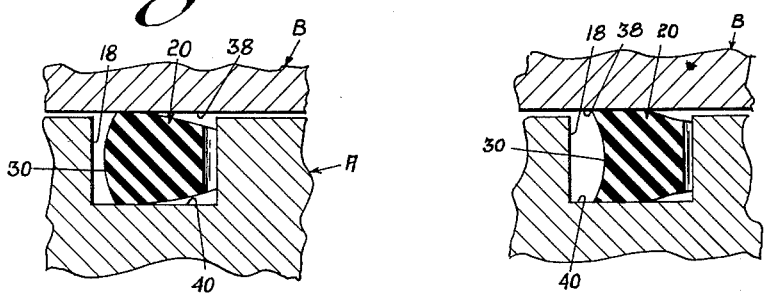
FIG. 2 is an enlarged, fragmentary, vertical sectional view taken from the assembly of FIG. 1, and illustrating the left hand, piston head packing ring in normal assembled position, and with no pressure being exerted by the fluid against the packing seal, or in other words, with the relatively movable parts of the piston and cylinder assembly of FIG. 1 being in reposed or rest position.
FIG. 3 is a view generally similar to that of FIG. 2, but illustrating the deformation or compression of the packing ring when fluid pressure is exerted against the front face or "fluid pressure" side of the seal.

When the packing ring is in assembled position in the grooves 18 of piston element A, or in the groove 22 in the head or cap member 16 of the piston and cylinder unit, the spacing between confronting surfaces 38 and 40 (FIGS. 2 and 3) of the cylinder B and piston A is such that the body of packing ring 20 will be squeezed or compressed, so that substantial co-planner contact occurs between the packing ring surfaces 26 and 28 and surfaces 38 and 40 respectively, and the front or "fluid pressure" side of the ring assumes a generally convex configuration, as shown in FIG. 2. This substantial co-planner contact and the convex configuration of front surface 30 occurs because of the generally forwardly divergent relationship of the outer and inner side surfaces 26 and 28 of the ring. When the piston A moves in the direction of the arrow in FIG. 1, the fluid pressure acting upon the "fluid pressure" side or front surface of the packing ring tends to flatten surface 30 or cause it to assume the generally concave configuration shown in FIG. 3. Since the packing ring 20 is resilient, and subject to cold flow, the contact pressure and the area of contact, between the outer and inner surfaces 26 and 28 and the confronting surfaces 38 and 40 of the cylinder and piston respectively substantially increases over that of the initially assembled or "rest" condition shown in FIG. 2. It will be understood of course that the same situation occurs in the case of the packing when used to seal the surfaces between the piston rod C and the cap member 16 upon application of fluid pressure to the seal.

The relatively greater resultant contact pressure and the increased area of contact between the packing ring and surfaces 38 and 40 being sealed upon the application of fluid pressure to the front face of the seal, permits the use of a lower initial contact or assembly pressure between the packing ring and the surfaces being sealed as compared to known O-ring types of packings, and in addition will provide longer wearing characteristics because of the decreased friction due to the aforementioned lower permissible initial assembly pressure as compared to an O-ring, and also because of the greater area provided for the dissipation of the heat generated by the frictional engagement. The packing element of the invention will also provide more positive sealing characteristics as compared to known types of U-cup packings, while retaining the anti-twist and wiping characteristics of the U-cup packing. The solid body of packing ring of the invention with the increased contact area thereof, actually carries the piston A and piston rod C which is not the case with the U-cup type of packing, and thus the manufacturing tolerances between the relatively movable parts of the assembly can be greater, resulting in a more economically manufactured unit.

The aforementioned radially extending grooves 34 in the rear or "no pressure" surface 32 of the packing ring insures that the packing will respond substantially immediately upon application of fluid pressure to the front or "pressure" surface 30 of the seal and especially in the event that the receiving space between the parts of the assembly being sealed is such that the contact between the packing and the confronting sealing surfaces (as for instance surfaces 38 and 40) on the parts being sealed just barely occur, when the unit assembly is in rest or "no motion" condition.

For instance, if the manufacturing tolerances were such that the latter condition occurred in the piston and cylinder assembly shown in the drawings, upon relative movement between these parts (i.e. cylinder B and piston A of the assembly), the portions of the body of the packing ring disposed intermediate grooves 34 will tend to deform or compress faster than the remainder of the body of the ring, thus creating a slight "vacuum" condition on the "no fluid pressure" side of the packing, thereby causing substantially instantaneous deformation or expansion of the side surfaces 26 and 28 into sealing contact with the confronting surfaces 38 and 40 of the cylinder and piston respectively. This "vacuum" condition is due not only to the fact that the grooves 34 remove material from the "no fluid pressure" side of the ring, and therefore increase the relative rate of compression of such side, but also to the fact that grooves 34 serve as passageways for the rapid flow of air forced from slot 18 in the piston on the "no fluid pressure" side of the packing member. Furthermore, any fluid initially escaping past the inner side surface 28 of the packing and the confronting surface 40 of the piston head A in the case of a loose tolerance situation, will tend to increase the vacuum condition, and will pass through the passageways or grooves 34. In other words, the grooves 34 provide a sealing ring arrangement which will close like a door slams when there is a certain air draft through the door.

From the foregoing description and accompanying drawings it will be seen that the invention provides a relatively simple packing which will not twist or turn when in assembled position in a dynamic sealing assembly, which will effectively wipe off foreign matter on the relatively movable parts of the assembly being sealed, which will provide greatly increased sealing characteristics, and which has much greater wearing qualities as compared to O-ring and U-cup type seals heretofore known. The packing element of the invention will also permit the use of greater tolerances between relatively movable parts of an assembly while still providing an effective seal, thereby resulting in more economically desirable unit assemblies.

The terms and expressions which have been used are terms of description and not of limitation and there is no intention in the use of such terms and expression of excluding any equivalents of the features shown and described or portions thereof, but it is recognized that various modifications are possible within the scope of the invention claimed.

I claim:

1. A fluid pressure sealing packing adapted for insertion in an annular peripheral groove in the inner one of a pair of nested relatively axially movable members for sealing the clearance gap between the members comprising, a ring-like body of generally flexible resilient material, said body being of trapezoidal configuration in cross section and comprising generally flat parallel extending front and rear surfaces and forwardly diverging outer and inner side surfaces, said side surfaces diverging continuously outwardly with respect to one another from said rear surface to said front surface, said front surface being substantially smooth and being the fluid pressure engaging surface of said packing, said rear surface being located solely in a plane disposed perpendicular to the axis of revolution of said body, said rear surface having a plurality of circumferentially spaced generally radially extending slots therein, each of said slots opening at each of its ends onto the respective of said side surfaces, said front surface being adapted to be engaged by operating fluid pressure to deform said body whereby said outer and inner side surfaces will be caused to expand into positive sealing contact with the respective confronting surface of each of said members, said slots being adapted to transmit operating fluid therethrough from said inner side surface to said outer side surface.

2. A packing in accordance with claim 1 wherein said slots are evenly spaced in a circumferential direction with respect to one another.

3. A fluid pressure sealing packing adapted for insertion in an annular peripheral groove in one of a pair of nested relatively axially movable members for sealing the clearance gap between the members comprising, a ring-like body of generally flexible resilient material, said body comprising front and rear surfaces and forwardly diverging outer and inner side surfaces, said side surfaces diverging continuously outwardly with respect to one another from said rear surface to said front surface, said front surface being the fluid pressure engaging surface of said packing, said rear surface being substantially flat and being located solely in a plane disposed perpendicular to the axis of revolution of said body, said rear surface having at least one generally radially extending slot therein, said slot opening at each of its ends onto the respective of said side surfaces, said front surface being adapted to be engaged by fluid pressure to deform said body whereby said inner and outer side surfaces will be caused to expand into positive sealing contact with the respective confronting surface of each of said members, said slot being adapted to transmit operating fluid therethrough from one of said side surfaces to the other side surface.

4. In combination, a pair of relatively axially movable parts disposed in telescoping relation, one of said parts having an annular peripheral groove therein, and a fluid pressure sealing packing disposed in said groove and sealing the clearance gap between said parts while maintaining said parts out of contact with each other, said packing comprising a ring-like body of generally flexible resilient material, said body being adapted to be compressed between confronting axially extending surfaces of said parts, said body comprising front and rear surfaces and outer and inner side surfaces, said outer and inner side surfaces being forwardly divergent with respect to one another when said body is in uncompressed condition, said front surface being the fluid pressure engaging surface of said packing, said rear surface having a plurality of circumferentially spaced generally radially extending slots therein, each of said slots opening at each of its ends onto the respective of said side surfaces, said front surface being engageable by fluid pressure whereby said rear surface seats against the confronting defining surface of said groove and said body is deformed causing said side surfaces to expand into increased sealing contact with said confronting surfaces of said parts, said slots providing for free passage of any fluid trapped back of said front surface of said packing to flow behind the packing intermediate said packing and said confronting defining surface of said groove.

5. In combination, a pair of relatively axially movable parts disposed in telescoping relation, one of said parts having an annular peripheral groove therein, and a fluid pressure sealing packing disposed in said groove and sealing the clearance gap between said parts while maintaining said parts out of contact with each other, said packing comprising a ring-like body of generally flexible resilient material, said body being adapted to be compressed between confronting axially extending surfaces of said parts, said body being of generally trapezoidal configuration in cross section and comprising front and rear surfaces and generally forwardly diverging outer and inner side surfaces, said front surface assuming a generally convex configuration in compressed condition between said confronting surfaces of said parts and there is no relative axial movement between said parts, said front surface being the fluid pressure engaging surface of said packing, said rear surface having a plurality of circumferentially spaced generally radially extending slots therein, each of said slots opening at each of its ends onto the respective of said side surfaces, said front surface being engageable by fluid pressure whereby said rear surface is adapted to seat against the confronting defining surface of said groove and said body will be deformed causing said front surface to assume a generally concave configuration and said side surface to expand into increased coplanar sealing contact with said confronting surfaces of said parts, said slots providing for free passage of any fluid trapped back of said front surface of said packing to flow behind said packing intermediate said packing and said confronting defining surface of said groove.

6. In combination, a pair of relatively axially movable parts disposed in telescoping relation, one of said parts having an annular peripheral groove therein, and a fluid pressure sealing member disposed in said groove and sealing the clearance gap between said parts while maintaining said parts out of contact with each other, said member comprising a ring-like body of generally flexible resilient material, said body being adapted to be compressed between confronting axially extending surfaces of said parts, said body comprising front and rear surfaces and outer and inner side surfaces, said side surfaces being generally forwardly divergent with respect to one another from said rear surface to said front surface, said front surface being the operating fluid pressure engaging surface of said sealing member, said rear surface being flat and located solely in plane disposed perpendicular to the axis of revolution of said body, said rear surface having a plurality of circumferentially spaced generally radially extending slots therein, each of said slots opening at each of its ends onto the respective of said side surfaces, said front surface being engageable by pressurized operating fluid whereby said rear surface is adapted to seat against the confronting defining surface of said groove and said body will be deformed causing said side surfaces to expand into sealing contact with said confronting surfaces of said parts, said slots providing for free passage of any operating fluid trapped back of said front surface of said sealing member to flow behind said member intermediate the latter and said confronting defining surface of said groove.

References Cited in the file of this patent

UNITED STATES PATENTS

| | | |
|---|---|---|
| 579,643 | Gleason | Mar. 30, 1897 |
| 1,052,705 | Wismer | Feb. 11, 1913 |
| 2,587,091 | Barnes et al. | Feb. 26, 1952 |
| 2,660,493 | Flick | Nov. 24, 1953 |
| 2,731,315 | Church | Jan. 17, 1956 |
| 2,799,523 | Parker | July 16, 1957 |
| 2,841,429 | McGuistion | July 1, 1958 |
| 2,873,132 | Tanner | Feb. 10, 1959 |
| 2,885,227 | Burger | May 5, 1959 |